(12) United States Patent
Peden et al.

(10) Patent No.: US 9,998,908 B1
(45) Date of Patent: Jun. 12, 2018

(54) DATA TRANSFER MANAGEMENT BASED ON PREDICTED ROAMING STATUS AND APPLICATION BEHAVIOR

(71) Applicant: Sprint Spectrum L.P., Overland Park, KS (US)

(72) Inventors: Mark D. Peden, Olathe, KS (US); Rodney D. Nelson, Overland Park, KS (US); Paul M. Andreas, Overland Park, KS (US); John Eric Belser, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days. days.

(21) Appl. No.: 15/452,884

(22) Filed: Mar. 8, 2017

(51) Int. Cl.
*H04W 4/00* (2009.01)
*H04W 8/02* (2009.01)
*H04W 8/22* (2009.01)

(52) U.S. Cl.
CPC ............... *H04W 8/02* (2013.01); *H04W 8/22* (2013.01)

(58) Field of Classification Search
CPC .................................. H04W 8/02; H04W 8/22
USPC ....................................................... 455/432.1
See application file for complete search history.

(56) References Cited

U.S. PATENT DOCUMENTS

| | | | |
|---|---|---|---|
| 7,275,089 B1 | 9/2007 | Marshall et al. |
| 7,756,946 B1 | 7/2010 | Roka et al. |
| 8,041,777 B2 | 10/2011 | Roka et al. |
| 8,095,642 B1 | 1/2012 | Martin et al. |
| 8,560,002 B1 | 10/2013 | Narendran et al. |
| 8,577,732 B1 | 11/2013 | Martin et al. |
| 8,832,792 B2 | 9/2014 | Mikan |
| 2008/0132269 A1 | 6/2008 | Shen et al. |
| 2010/0017521 A1 | 1/2010 | Ying et al. |
| 2012/0140743 A1 | 6/2012 | Pelletier et al. |
| 2013/0115990 A1 | 5/2013 | Koc et al. |
| 2013/0223335 A1 | 8/2013 | Kwag et al. |
| 2013/0242730 A1 | 9/2013 | Pelletier et al. |
| 2013/0301541 A1 | 11/2013 | Mukherjee et al. |
| 2014/0098778 A1 | 4/2014 | Valentin et al. |
| 2014/0106770 A1 | 4/2014 | Valentin et al. |
| 2014/0307659 A1 | 10/2014 | Kweon et al. |
| 2014/0362778 A1 | 12/2014 | Belghoul |

(Continued)

FOREIGN PATENT DOCUMENTS

WO   WO2016061566   4/2016

*Primary Examiner* — Amancio Gonzalez

(57) ABSTRACT

A method and system is disclosed for controlling communication behavior of application programs running on a user equipment device (UE) based on joint consideration of predicted roaming and predicted communication behavior of the application programs. A UE may monitor its operational state data during times when it is operating in a wireless network of a home service provider and during other times when it is roaming in a wireless network of a different service provider, and apply the monitored operational state data to a roaming prediction model configured for predicting future roaming state. The UE may also monitor communication behavior data of resident application programs, and apply the monitored communication behavior data to an application-communication prediction model configured for predicting future communication behavior of the applications. The UE may then control communication behavior of the application programs based on the roaming prediction model and the application-communication prediction model.

20 Claims, 7 Drawing Sheets

(56) References Cited

U.S. PATENT DOCUMENTS

| | | |
|---|---|---|
| 2015/0031365 A1 | 1/2015 | Tajima et al. |
| 2015/0172955 A1 | 6/2015 | Meekel et al. |
| 2015/0195716 A1 | 7/2015 | Worrall et al. |
| 2015/0230152 A1 | 8/2015 | Raleigh et al. |
| 2016/0309379 A1 | 10/2016 | Pelletier et al. |
| 2017/0094570 A1 | 3/2017 | Kim et al. |
| 2017/0135135 A1 | 5/2017 | Pelletier et al. |
| 2017/0251516 A1 | 8/2017 | Bangolae et al. |

DATA TRANSFER MANAGEMENT BASED ON PREDICTED ROAMING STATUS AND APPLICATION BEHAVIOR

BACKGROUND

Unless otherwise indicated herein, the materials described in this section are not prior art to the claims and are not admitted to be prior art by inclusion in this section.

Cellular wireless networks typically include a number of base stations that radiate to define wireless coverage areas, such as cells and/or cell sectors, in which user equipment devices (UEs) (also referred to as wireless communication devices (WCDs)) such as cell phones, "smart" phones, tablet computers, tracking devices, embedded wireless modules, and other wirelessly equipped communication devices, can operate. Each base station is coupled to network infrastructure that provides connectivity with one or more transport networks, such as the public switched telephone network (PSTN) for voice communications and/or the Internet for voice and/or data communications for instance.

In general, a wireless network operates in accordance with a particular air interface protocol or radio access technology, with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE) or Wireless Interoperability for Microwave Access (WiMAX)), Code Division Multiple Access (CDMA) (e.g., 1×RTT and 1×EV-DO), and Global System for Mobile Communications (GSM), among others. Each protocol defines its own procedures for registration of UEs, initiation of communications, allocation of bandwidth for UE communications, handoff/handover between coverage areas, and functions related to air interface communication.

In practice, a base station may be configured to provide service to UEs on multiple carrier frequencies or "carriers." Each carrier could be a time division duplex (TDD) carrier that defines a single frequency channel multiplexed over time between downlink and uplink use, or a frequency division duplex (FDD) carrier that defines two separate frequency channels, one for downlink communication and one for uplink communication. Each frequency channel of a carrier may then occupy a particular frequency bandwidth (e.g., 1.4 MHz, 3 MHz, 5 MHz, 10 MHz, or 20 MHz) defining a range of frequency at a particular position (e.g., defined by a center frequency) in a radio frequency band (e.g., in the 800 MHz band, the 1.9 GHz band, or the 2.5 GHz band).

With this arrangement, a UE within the coverage area of the wireless network may engage in air interface communication with a base station. This arrangement enables UEs to communicate via the base station with various remote network entities or with other UEs served by the base station or by one or more other base stations.

In a number of markets, cellular wireless service is available from more than one service provider or "carrier," each service provider deploying and operating its own wireless communication network, for example. Owing to unequal coverage of respective wireless communication networks of two or more different service providers, or other possible factors affecting relative coverage, a subscriber in one service provider's network may, from time to time, gain access to and receive service from the wireless communication network of a different service provider. When this occurs, the subscriber is said to be "roaming" in the different service provider's network. Customarily, the subscriber's network is referred to as the "home" network, and the "roamed-to" network is referred to as the "roaming network," "visited network," or "foreign network." Service providers may typically establish "service level agreements" ("SLAs") between each other to accommodate roaming of their respective subscribers in each other's networks. SLAs may specify how costs of providing un-subscribed service to each other's respective subscribers are identified, recovered, and resolved.

OVERVIEW

Communications from a base station to a mobile communication device (or just mobile device), such as a UE, are carried on a "forward link" (e.g., in a CDMA system) or "downlink" (e.g., in a UMTS/LTE network) of an air interface between the UE and base station, and communications from a UE to the base station are carried on "reverse link" (e.g., in a CDMA system) or "uplink" (e.g., in a UMTS/LTE network) of the air interface. Transmitting data in the downlink direction can be generally referred to as "downloading," while transmitting data in the uplink direction can be generally referred to as "uploading."

Downlink and uplink communications between a UE and a base station can be further distinguished as "background communications" or "foreground communications." In the downlink direction, "background downloading" is a process by which the UE downloads data or some form of content without user input at the time. For example, the UE or an application program executing on the UE may be programmed to automatically download content at particular times, and the UE or application program may do so without prompting the user for approval and without receiving a user request or approval at the time to do so. As another example, the UE or an application program executing on the UE may receive a content-notification message indicating that content is available to be downloaded, and the UE or application program executing on the UE may responsively download the content without prompting the user for approval and without receiving a user request or approval at the time to do so. (When the UE or an application program executing on the UE conducts a background download, the user may or may not perceive the device conducting the background download. For instance, the UE or the application program executing on the UE may or may not present a notice when it is conducting the background download).

On the other hand, "foreground downloading" is a process by which the UE or an application program executing on the UE downloads the content in response to user request or approval at the time, or as part of communication or transaction in which the user is actively involved. For example, a user may be engaged in a voice or video call. As another example, the user may invoke a browser or other application program on the UE and thereby direct the UE or the application program executing on the UE to download particular content at the time, and the device may responsively do so. As still a further example, the UE or an application program executing on the UE may receive a content-notification message indicating that content is available to be downloaded, the UE or application program executing on the UE may responsively prompt the user for approval and receive user approval. In response to the user approval, the device may then download the content, as another instance of foreground downloading.

Similar descriptions and/or distinctions apply to "background uploading" and "foreground uploading."

In general, foreground communications may be considered those which involve some aspect of direct user involvement, whether simply responding to a prompt to engage in the communication or being actively involved in a real-time application such as a voice or video call or other transmission involving media data. In contrast, background communications may be considered those which may occur without user involvement or even user knowledge. One aspect of distinction between background and foreground communications may therefore also relate to a relative importance to user experience, user expectation regarding service, or degree of criticality of an application or UE function. More particularly, it may be acceptable or desirable to delay, limit, or prevent background communications at times or under conditions when network resources required for supporting such communications are overloaded, unavailable, or deemed too expensive to allocate. At the same time, it may not be acceptable or desirable to apply any such restrictions or limitations to foreground communications under the same or similar network circumstances.

Non-limiting examples of circumstances that could warrant consideration of whether background communications should be subject to delay or some addition form of control, possibly while refraining from limiting or impeding foreground communications, include times when network resources are overloaded, if/when it is determined that a user has consumed more than some threshold amount of data services, or if/when a user's subscribing service provider determines that the user is roaming in the wireless network of another, different service provider. Among these circumstances, roaming may be of interest to a service provider, because roaming costs paid by a home network to a foreign network according a SLA, for example, can exceed the fees collected from the home network's subscribers for various types of services, including roaming in the foreign network.

Limiting, delaying, and/or applying access control to background (or other types of) communications between a UE and a wireless network when the UE is roaming may provide some mitigation of undue or unnecessary roaming costs. However, imposing limits or delays routinely during roaming or for background communications can be a coarse approach, since it may overlook patterns of behavior of individual UEs with respect to roaming history, specific needs of application programs, and other factors that indicate more appropriate and/or intelligent criteria for managing communications. In particular, it would be desirable to be able to predict when roaming will occur, as well as communication behavior of individual application programs in order to adapt UE communications with wireless networks in a way that accommodates roaming and communication needs of the UE.

Accordingly, example embodiments herein provide for systems and methods for tracking and analyzing both roaming history of a UE and communication behavior of application programs executing on the UE in order to predict when the UE will transition to and/or engage in roaming, and predict communication needs and/or activities of one or more application programs. By making these predictions jointly, communication to and from the UE can be controlled so as to adapt to roaming circumstances and communication needs of application programs in a way that anticipates as well as responds to changing circumstances of the UE. Hence, in one respect, various embodiments of the present invention provide, in a user equipment device (UE) configured for operating in wireless communication networks, a method comprising: monitoring operational state data of the UE during times when the UE is operating in a wireless communication network of a home service provider and during other times when the UE is roaming in a wireless communication network of a different service provider, the operational state data including: location, time of day, roaming status, and communication activity status; applying the monitored operational state data to a roaming prediction model configured for predicting future roaming state, wherein roaming state comprises: roaming, not roaming, transition to roaming, and transition to not roaming; monitoring communication behavior data of one or more application programs executing on the UE, the communication behavior data including: type of wireless communications engaged in by the one or more application programs, type of data transferred during wireless communications engaged in by the one or more application programs, amount of data transferred during wireless communications engaged in by the one or more application programs, duration of wireless communications engaged in by the one or more application programs, time of day, and location; applying the communication behavior data to an application-communication prediction model configured for predicting future communication behavior of the one or more applications, wherein communication behavior of the one or more applications comprises: scheduling communications with a network-based server, engaging in communications with a network-based server, and initiating communications with a network-based server; and based on the roaming prediction model and the application-communication prediction model, controlling communication behavior of at least one of the one or more application programs.

In another respect, various embodiments of the present invention provide a user equipment device (UE) configured for operating in wireless communication networks, the UE comprising: one or more processors; and memory storing instructions that, when executed by the one or more processors, cause the UE to carry out operations including: monitoring operational state data of the UE during times when the UE is operating in a wireless communication network of a home service provider and during other times when the UE is roaming in a wireless communication network of a different service provider, the operational state data including: location, time of day, roaming status, and communication activity status; applying the monitored operational state data to a roaming prediction model configured for predicting future roaming state, wherein roaming state comprises: roaming, not roaming, transition to roaming, and transition to not roaming; monitoring communication behavior data of one or more application programs executing on the UE, the communication behavior data including: type of wireless communications engaged in by the one or more application programs, type of data transferred during wireless communications engaged in by the one or more application programs, amount of data transferred during wireless communications engaged in by the one or more application programs, duration of wireless communications engaged in by the one or more application programs, time of day, and location; applying the communication behavior data to an application-communication prediction model configured for predicting future communication behavior of the one or more applications, wherein communication behavior of the one or more applications comprises: scheduling communications with a network-based server, engaging in communications with a network-based server, and initiating communications with a network-based server; and based on the roaming prediction model and the application-communication prediction model, controlling communication behavior of at least one of the one or more application programs.

In still another respect, various embodiments of the present invention provide a non-transitory computer-readable medium have instructions stored thereon that, when executed by one or more processors of a user equipment device (UE) configured for operating in wireless communication networks, cause the UE to carry out operations including: monitoring operational state data of the UE during times when the UE is operating in a wireless communication network of a home service provider and during other times when the UE is roaming in a wireless communication network of a different service provider, the operational state data including: location, time of day, roaming status, and communication activity status; applying the monitored operational state data to a roaming prediction model configured for predicting future roaming state, wherein roaming state comprises: roaming, not roaming, transition to roaming, and transition to not roaming; monitoring communication behavior data of one or more application programs executing on the UE, the communication behavior data including: type of wireless communications engaged in by the one or more application programs, type of data transferred during wireless communications engaged in by the one or more application programs, amount of data transferred during wireless communications engaged in by the one or more application programs, duration of wireless communications engaged in by the one or more application programs, time of day, and location; applying the communication behavior data to an application-communication prediction model configured for predicting future communication behavior of the one or more applications, wherein communication behavior of the one or more applications comprises: scheduling communications with a network-based server, engaging in communications with a network-based server, and initiating communications with a network-based server; and based on the roaming prediction model and the application-communication prediction model, controlling communication behavior of at least one of the one or more application programs.

These as well as other aspects, advantages, and alternatives will become apparent to those of ordinary skill in the art by reading the following detailed description, with reference where appropriate to the accompanying drawings. It should be understood, of course, that this summary and other description provided below is set forth for purposes of example only, and that numerous variations are possible, within the scope of the claimed invention.

DETAILED DESCRIPTION

The systems and methods described herein are set forth only as examples. As such, those skilled in the art will appreciate that other arrangements and element (e.g., machines, interfaces, functions, orders, and groupings of functions) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For example, one or more processors executing instructions stored in memory may implement one or more of the features and functions described herein.

Figure 1:
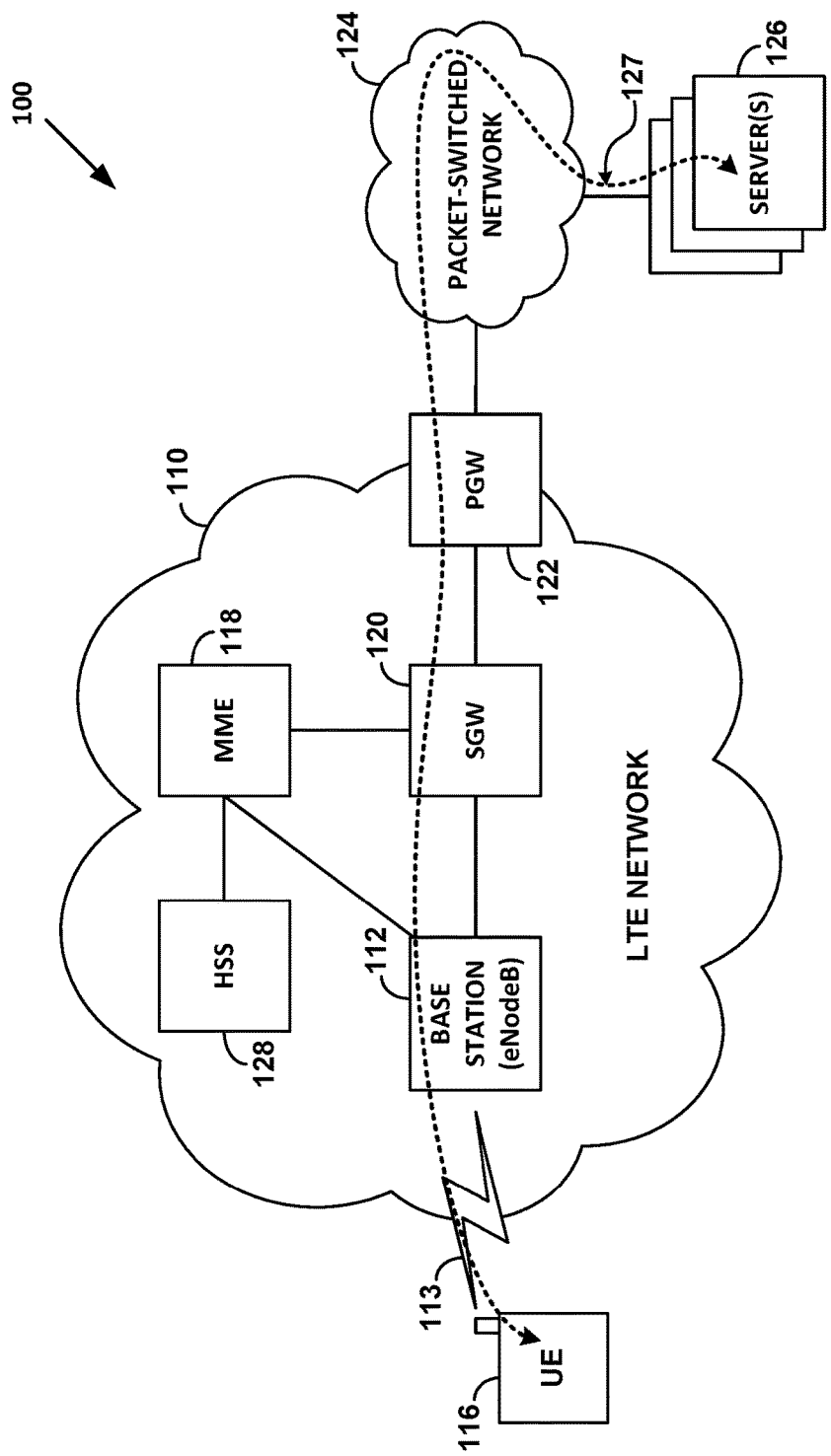
FIG. 1 is a simplified network diagram of an example wireless communications network, according to example embodiments of the disclosed systems and methods.

Referring to the drawings, FIG. 1 is a simplified block diagram of a wireless communication system 100 in which an example of the present method can be implemented. In particular, FIG. 1 includes by way of example a representative LTE radio access network (RAN) 110 including an example LTE base station 112 (also referred to as an eNode), which radiates to provide a wireless coverage area defining an LTE air interface 113 through which the base station 112 may serve one or more UEs. The base station 112 is then shown coupled with core LTE network infrastructure, which may include a mobility management entity (MME) 118, a serving gateway (SGW) 120 and a packet-data network gateway (PGW) 122 providing connectivity with a packet-switched network 124 such as the Internet, which may in turn support communications with various services, represented by servers 126, for example. Further, the MME is configured to communicate with a Home Subscriber Server (HSS) 128, which may store account and service profiles for various UEs. Shown within coverage of the base station 112 is then a representative UE 116. In practice, the LTE access network may be operated by a cellular wireless service provider, and the UE may subscribe to service of that provider.

In practice, many of these network components may be owned and/or operated by or for a telecommunications service provider such as a cellular wireless carrier and may physically sit as nodes on a core packet network operated by the service provider. Communications over the various illustrated interfaces may thus pass between various network entities as packet-based communications, such as IP communications for instance, through the core network.

With the example arrangement shown, when of the UE 116 enters into coverage of network, the UE may transmit an attach request over the air interface 113 to the base station 112. This attach request may then cause the network to establish for the UE one or more default bearers.

In particular, when the base station 112 receives this initial attach request from the UE, the base station may forward the attach request to the MME 118. The MME may then authenticate and authorize the UE and obtain from HSS 128 an indication of one or more application services to which the UE subscribes and may store an indication of those services in a context record for the UE, keyed to a UE identifier such as an International Mobile Subscriber Identity (IMSI) for instance. For each of various services, the MME may then allocate for the UE a respective bearer ID (e.g., evolved packet system (EPS) bearer ID), which the MME may store in the UE context record in correlation with an identity of the base station for instance. Further, for each such service, the MME then engage in signaling with the SGW 120 and the base station 112 to set up a respective bearer, defining a logical tunnel over which bearer data can flow to and from the UE.

For instance, assuming the UE is authorized for general packet-data service, the MME may engage in signaling with the SGW 120 and the base station 112 to set up for the UE a default bearer to carry general packet-data communication traffic. Further, if the UE is authorized for VoIP service, the MME may also engage in signaling with the SGW and the base station to set up for the UE another default bearer to carry VoIP call setup signaling (e.g., SIP signaling). Each of these bearers may have a corresponding level of service, such a quality of service (QoS) class indicator (QCI) level, as discussed above, which might be keyed to a service level agreement of the UE for instance.

The process of establishing each of these or other bearers may take various forms, the particular details of which are not critical. In a representative implementation, for instance, the MME may transmit to the SGW a create-session request, including in the request one or more parameters (e.g., a QCI value and/or an application service level identifier) indicating the service level and/or other type of bearer to be established and identifying the UE at issue (e.g., by IMSI). The SGW may then responsively send a corresponding create-session request to the PGW 122. Upon receipt of the create-session request, the PGW may then query a policy server for authorization to establish the requested bearer for the UE.

With approval, the PGW may then record an access bearer ID for the UE and may work with the SGW to establish a communication tunnel corresponding with the bearer. In particular, the PGW may transmit to the SGW a create-session response indicating the bearer being established (e.g., providing a bearer ID, CQI, UE identifier, etc.) and informing the SGW of an endpoint identifier (e.g., port and/or address) at the PGW to be used for the bearer. The SGW may then transmit an acknowledgement to the PGW, similarly informing the PGW of an endpoint identifier at the SGW to be used for the bearer. In this manner, the PGW and SGW will establish a tunnel for communicating with each other at their respective endpoint identifiers, and each correlate that tunnel with the bearer at issue, including bearer type parameters such as service level for instance.

The SGW may then transmit to the MME a create-session response that provides any applicable service level parameters for the bearer and that informs the MME of an endpoint identifier at the SGW to be used for communication between the SGW and the base station. The MME may then transmit to the base station an attach-accept message, providing any applicable service level parameters for the bearer and informing the base station of the endpoint identifier at the SGW to be used for communication between the SGW and the base station.

Upon receipt of the attach-accept message from the MME, the base station may then transmit over the air interface 113 to the UE a Radio Resource Control (RRC) Connection Reconfiguration message that specifies a radio-bearer ID and any applicable service level parameters, as well as an attach-accept message. The UE may then store the bearer ID and any applicable parameters and send an RRC Connection Reconfiguration Complete message to the base station, indicating setup of the radio-bearer for air interface communication between the UE and the base station.

Further, the base station may transmit to the MME an attach-complete message, and the MME may transmit to the SGW a corresponding attach-complete message that informs the SGW of an endpoint identifier at the base station to be used for communication between the SGW and the base station. In this manner, the base station and SGW will have established a tunnel for communicating with each other at their respective endpoint identifiers, and each would correlate that tunnel with the bearer at issue, including bearer type parameters such as service level for instance.

Through this or another process, a bearer would thus be established for the UE, including a radio-bearer portion that extends over the air interface between the UE and the base station, and an access-bearer that extends between the base station and the SGW and between the SGW and the PGW. Each of the entities involved in communication over this bearer, including the UE, base station, SGW, and PGW for instance, may also maintain service level parameters for the bearer, so as to facilitate treating communications in an appropriate manner, such as with best-effort service level, guaranteed-bit-rate service level, or another service level for instance.

Beyond establishment of one or more default bearers for the UE, the network may also establish for the UE one or more other bearers. As noted above, for instance, if a VoIP call is to be set up for the UE, the network may establish for the UE a dedicated bearer for use to carry the VoIP traffic to and from the UE with an appropriate service level such as a sufficiently high guaranteed bit rate. For example, if the UE engages in SIP signaling with a call server on transport network 124 to set up a VoIP call, signaling may pass to the PGW to trigger setup of a QCI 1 level bearer for carrying the VoIP bearer traffic. The PGW may then engage in signaling with the SGW, which may in turn engage in signaling with the MME, and the MME may engage in signaling like that described above to control setup of the QCI 1 bearer, including setup of the radio bearer portion and access bearer portion.

With this arrangement, the UE may also engage in communications with one or more network servers, represented by server(s) 126 in FIG. 1, or other entities that provide various services. Non-limiting examples may include media streaming services, application servers, search services, social media sites, content servers, and cloud storage servers, among others. Communications between the UE 116 and the servers 128 (and the services represented) may traverse a communication path 127 that includes the air interface 112, base station 112, SGW 120, PGW 122, and the packet-switched network 124. Other entities not explicitly shown in FIG. 1 may be in the path as well.

When a UE, such as the UE 116, engages in a communication session, the communication may be a foreground communication or a background communication. As described above, a foreground communication may be one that involves active interaction with the user of the UE. For example, a foreground communication may be part of a user application such as a game, video display, or other media program. A background communication, on the other hand, might be one that is carried out without user interaction or possibly even user knowledge. Examples could include download of application program updates, upload of user location information, or download of social media data, to name a few.

A service provider may find it advantageous to limit or delay background communications that occur when a UE is roaming. This is because resources allocated for a roaming UE include those of the visited network (i.e., the wireless network of the different service provider). The UE's home service provider must pay compensation to the visited network, for example in accordance with a SLA. These costs can exceed what the subscriber pays the home service provider for similar resources, for example based on a monthly service plan. Thus, the home network may derive cost benefits by limiting or delaying background communications with the UE when it is roaming. However, doing so simply in response to a determination that the UE is roaming forfeits the ability to plan ahead for transitions of UE operation to and from roaming and to fold such transitions into known or knowable communication behaviors—particularly, those which are background communications—of applications running on the UE.

In accordance with example embodiments, then, a UE may implement a facility or function for tracking and predicting roaming transitions and tracking and predicting application communication behaviors, and merging the information to modify when and how applications engage in future background communications. For example, predictions of roaming and of applications communications behavior can be used to trigger engaging an anticipated background communication ahead of schedule in order to complete it before a predicted transition to UE roaming. In another example, an anticipated background communication could be delayed in order to avoid carrying it out during a time when roaming is predicted. As still another example, an application of the UE could query a roaming-prediction function and adjust the schedule of a background communication based on a predicted transition to roaming. Before describing example embodiments of the prediction-based approach in more detail, it is useful to first review a few different roaming scenarios. This is discussed below with reference to FIGS. 2, 3, and 4.

Figure 2:
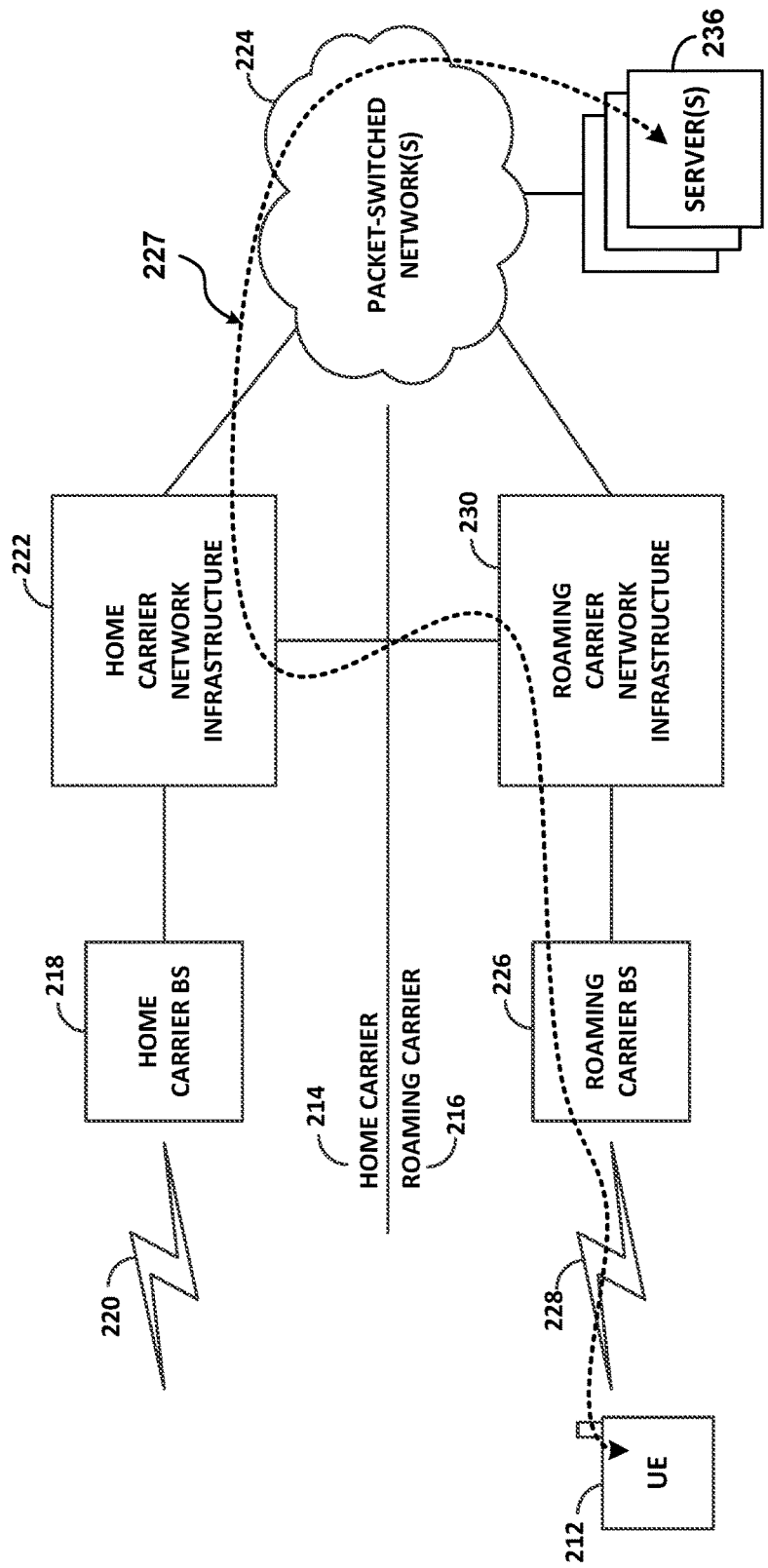
FIG. 2 is a simplified network diagram of a first example of wireless communications networks of two service providers, according to example embodiments of the disclosed systems and methods.

FIG. 2 is a simplified block diagram illustrating respective wireless communication networks of two service providers, or "carriers," interconnected in an arrangement that could support roaming between the networks of respective subscribers of the two networks, and in which example embodiments of the present method can be implemented. For purpose of the illustration, the two service providers are identified simply as home carrier 214 and roaming carrier 216. By way of example, a mobile device, such as UE 212, is taken to be a subscriber of the home carrier 214 that is roaming in the wireless network of the roaming carrier 216. The home carrier system 214 includes a representative home carrier base station 218, which radiates to provide a home carrier coverage area 220, and representative home carrier network infrastructure 222, which provides connectivity with one or more packet-switched networks 224. Further, the roaming carrier system 216 includes a representative roaming carrier base station 226, which radiates to provide a roaming carrier coverage area 228, and representative roaming carrier network infrastructure 230, and also provides connectivity with the packet-switched network(s) 224, which may in turn enable packet communications with one or more server(s) 236, for example. In practice, the respective carrier infrastructures could be connected to different packet-switched networks, or different intervening networks (not shown). In addition, as shown, the roaming carrier network infrastructure 230 is communicatively linked with the home carrier network infrastructure 222, to facilitate exchange of control and bearer data between the carriers' networks.

In this arrangement, it is assumed that the home carrier system 214 is provided by a home carrier, the roaming carrier system 216 is provided by a roaming carrier that has a roaming agreement with the home carrier, and the UE 212 subscribes to service of the home carrier. It is further assumed that the UE is currently not within any coverage of the home carrier system (including coverage 220 of home carrier base station 218) that is sufficiently strong to trigger attachment with the home carrier. By way of example the UE is assumed to be within sufficiently strong coverage of roaming carrier base station 226 to trigger attachment with that roaming carrier base station 226.

With such an arrangement, the UE may transmit an attach request over the air interface 228 to the roaming carrier base station 226, which may trigger signaling to the roaming carrier network infrastructure 230 and in turn to the home carrier network infrastructure 222. The home carrier network infrastructure 222 may then authenticate and authorize the UE for service. Further, the home carrier network infrastructure 222 may assign an IP address for use by the UE to communicate on the packet-switched network. In practice, the home carrier network infrastructure 222 may select this IP address from a default pool of IP addresses available for assignment to UEs and may direct use of the selected IP address by the UE.

Upon thus becoming attached via the roaming carrier base station 226 and being assigned an IP address by the home carrier network infrastructure 222, the UE 212 may then use the assigned IP address to engage in packet-data communication on the packet-switched network that extends via the roaming carrier base station 226, the roaming carrier network infrastructure 230, and the home carrier network infrastructure 222. The UE 212 may then engage in one or more communications sessions, including one with the server(s) 236 in the packet-switched network(s) 224. As shown, such communication sessions may traverse a communication path 227 that includes network entities in both home and roaming carrier systems.

Figure 3:
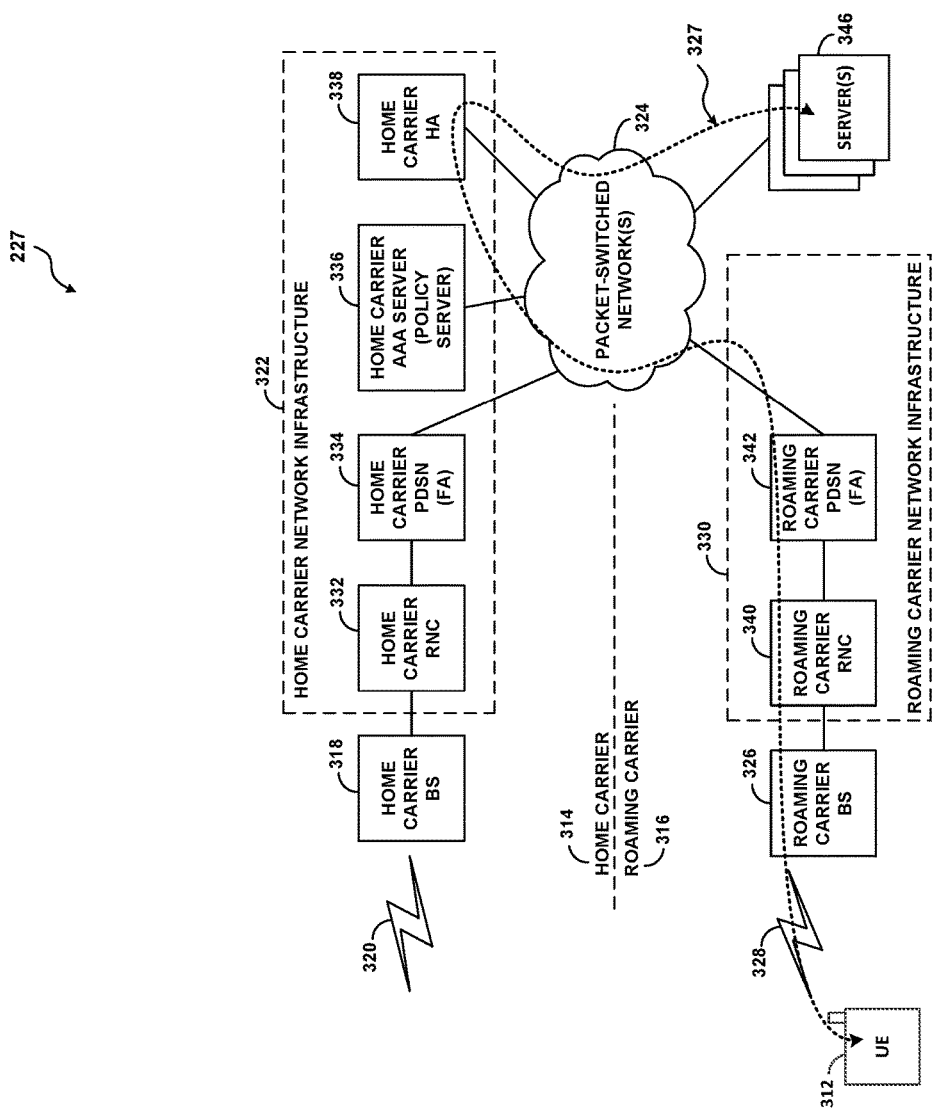
FIG. 3 is a simplified network diagram of a second example of wireless communications networks of two service providers, according to example embodiments of the disclosed systems and methods.

In the arrangement of FIG. 2, for instance, when UE 212 seeks to attach via the roaming carrier base station 226 and associated signaling therefore passes to the home carrier network infrastructure 222, the home carrier network infrastructure 222 may authenticate and authorize the UE for service. Further, in that attachment process or perhaps in response to a related request for assignment of an IP address to the UE, the home carrier network infrastructure 222 will assign an IP address to the UE. In doing so, the home carrier network infrastructure 222 may determine that the UE is being served by a roaming carrier's cell site (e.g., is attached via the roaming carrier's cell site or is attempting to so attach). FIG. 3 next depicts an example "3G" network arrangement again illustrative of roaming support, in this example between home carrier 314 and roaming carrier 316, and in which example embodiments of the present method can be implemented. In this example arrangement, the home carrier base station 318 and roaming carrier base station 326 may be base transceiver stations (BTSs), access nodes (ANs), NodeBs, or the like, and the home carrier coverage area 320 and roaming carrier cover area 328 may each be compliant with an air interface protocol such as Code Division Multiple Access (CDMA) or Global System for Mobile Communication (GSM), for instance. The home carrier network infrastructure 322 then includes a radio network controller (RNC) 332 that controls aspects of home carrier base station operation, a packet data serving node (PDSN) 334 that provides connectivity with one or more packet-switched network(s) 324, an authentication, authorization, and accounting (AAA) server 336 that functions as a policy server, and a Mobile-IP home agent (HA) 338 that provides IP address assignment. Further, the roaming carrier network infrastructure 330 likewise includes an RNC 340 that controls aspects of roaming carrier base station operation, and a PDSN 342 that provides connectivity with the packet-switched network(s) 324, which in turn may enable packet communications with one or more server(s) 346, for example.

With this arrangement, when a UE 312 does not detect sufficient home carrier coverage but detects sufficient coverage of roaming carrier base station 326, the UE may transmit an access request or connection request over the air to the roaming carrier base station 326, which the roaming carrier base station 326 may forward to the roaming carrier RNC 340. The roaming carrier RNC 340 may then direct the roaming carrier base station 326 to establish a radio-link layer connection over the air interface with the UE, and the roaming carrier base station 326 may do so.

Provided with that radio-link layer connection, the UE may then engage in signaling with the roaming carrier PDSN 342 to establish a data-link layer connection. In particular, the UE may transmit via the roaming carrier base station 326 to the roaming carrier RNC 340 a request to establish a point-to-point protocol (PPP) session with the roaming carrier PDSN 342, and the roaming carrier RNC 340 would send an associated registration request to the roaming carrier PDSN 342. This PPP session request and associated registration request may carry an identifier of the UE, such as a network access identifier, which also indicates the UE's home carrier. Based on that identifier or other data, the roaming carrier PDSN 342 may therefore signal to the UE's home carrier AAA server 336 for authorization. Thus, the roaming carrier PDSN 342 may transmit a RADIUS request to the home carrier AAA server 336 seeking authorization to serve the UE. Upon successful authorization, signaling may then pass back to the roaming carrier PDSN 342 and ultimately to the UE to complete data-link layer establishment.

Having an established radio-link layer connection with the roaming carrier base station 326 and a data-link layer connection with the roaming carrier PDSN 342, the UE may then engage in signaling to establish a network-layer connection through which to engage in communication on the packet-switched network(s) 324. In particular, the UE may transmit to the roaming carrier PDSN 342 a Mobile-IP registration request destined to the home carrier HA 338, and the roaming carrier PDSN 342, acting as a Mobile-IP foreign agent (FA), may forward that request to the home carrier HA 338. The home carrier HA 338 may then select an IP address to assign to the UE, record a binding between that selected IP address and a care-of address (such as an IP address of the roaming carrier PDSN 342), and send a reply to the UE specifying the assigned IP address.

Provided with the assigned IP address, the UE may then use that IP address to engage in communication with one or more server(s) 346 in (or accessible via) the packet-switched network(s) 324. In particular, the UE may transmit packet-data from that IP address to a destination IP address, and that packet-data may flow via the roaming carrier base station 326, the roaming carrier RNC 340, and the roaming carrier PDSN 342 to the home carrier HA 338 and via the packet-switched network(s) 324 to its destination. Further, when another party transmits data to the UE's assigned IP address, that data may flow over the packet-switched network(s) 324 to the home carrier HA 338, and the home carrier HA 338 may forward that data to the roaming carrier PDSN 342 for transmission via the roaming carrier RNC 340 and roaming carrier base station 326 to the UE. The communication path 327 illustrates such a path between the UE 312 and server(s) 346.

Figure 4:
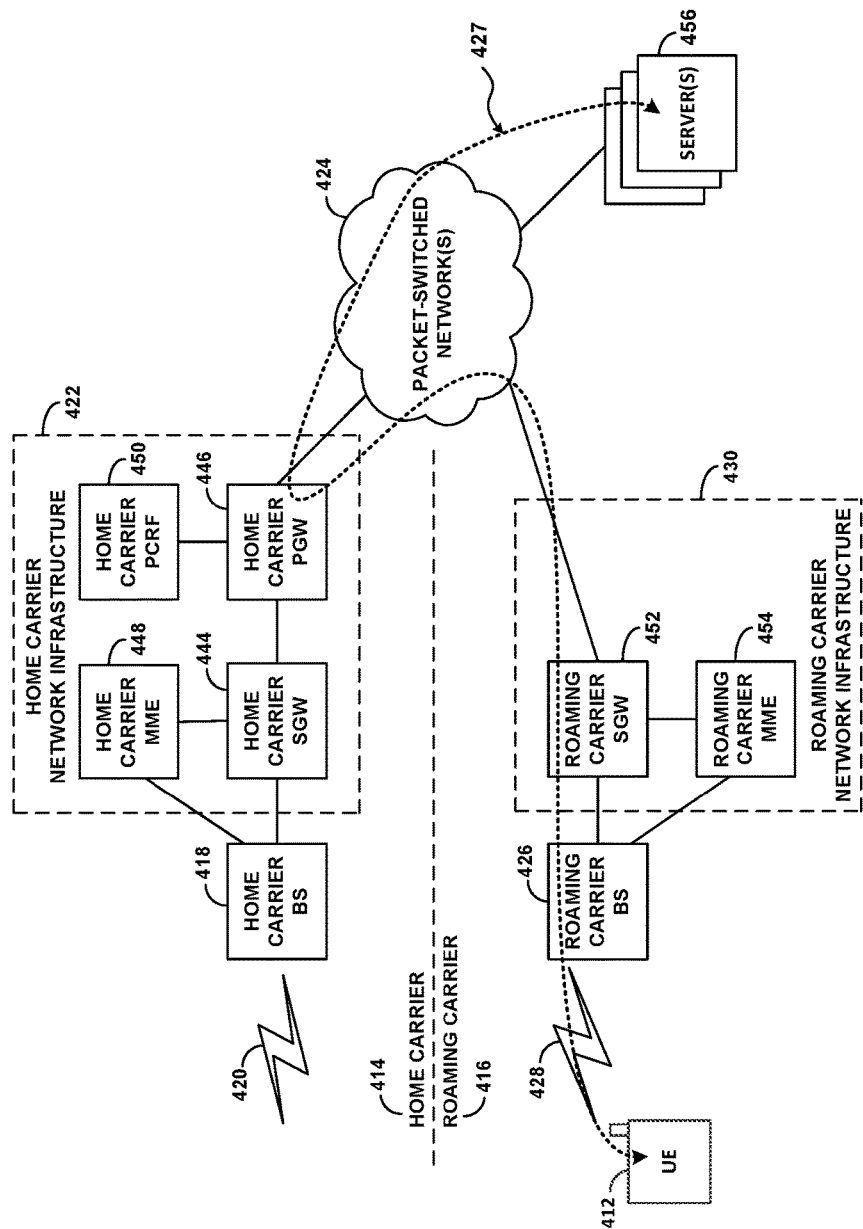
FIG. 4 is a simplified network diagram of a third example of wireless communications networks of two service providers, according to example embodiments of the disclosed systems and methods.

As one more example, FIG. 4 depicts an example "4G" network arrangement again illustrative of roaming support, in this example between home carrier 414 and roaming carrier 416, and in which example embodiments of the present method can be implemented. In this example arrangement, the home carrier base station 418 and roaming carrier base station 426 may be eNodeBs or the like, and the home carrier coverage area 420 and roaming carrier cover area 428 may each be compliant with an air interface protocol such as LTE (an Orthogonal Frequency Division Multiple Access (OFDMA) protocol). The home carrier network infrastructure 422 then includes a serving gateway (SGW) 444 interfaced with the home carrier base station (eNodeB) 418, a packet data network gateway (PGW) 446 interfaced with the SGW and providing connectivity with the packet-switched network(s) 424 for access to server(s) 456, a mobility management entity (MME) 448 interfaced with the SGW 444 and with the home carrier base station 418, and a policy and charging rules function (PCRF) 450 interfaced with the PGW 446 and functioning as a policy server. Further, the roaming carrier network infrastructure 430 likewise includes an SGW 452 and an MME 454.

With this arrangement, when UE 412 does not detect sufficient home carrier coverage but detects sufficient coverage of roaming carrier base station 426, the UE may transmit to the roaming carrier base station 426 an attach request, including an identifier of the UE (e.g., international mobile subscriber identity (IMSI)) and an identifier of the UE's home carrier (e.g., public land mobile network (PLMN) identifier (H-PLMN ID), which the roaming carrier base station 426 may pass to the roaming carrier MME 454. The roaming carrier MME 454 may then responsively transmit to the roaming carrier SGW 452 a create_session request, including the UE-provided information as well as a global identifier of the roaming carrier cell site that incorporates both an identifier of the roaming carrier (e.g., visited PLMN ID (V-PLMN ID)) and a cell-site ID.

Based on the included information indicating that this is a roaming UE, the roaming carrier SGW 452 may then responsively transmit a corresponding create_session request to the UE's home carrier PGW 446, similarly including the UE provided information and the global cell identifier. In turn, the home carrier PGW 446 may then send to the home carrier PCRF 450 a DIAMETER message that similarly includes the UE provided information and the global cell identifier and that seeks authorization and an indication of any applicable policy rules. And the home carrier PCRF 50 may then respond to the home carrier PGW 46 with a directive for the home carrier PGW 446 to assign an IP address to the UE. Thus, the home carrier PCRF 450 may select an IP address to assign to the UE, record a binding between that IP address and the UE, and send to the roaming carrier SGW 452 a create_session response specifying the assigned IP address. The roaming carrier SGW 452 may then signal in turn to the roaming carrier MME 454, which may signal in turn to the roaming carrier base station 26, which may signal in turn to the UE, providing the UE with the assigned IP address.

Provided with this assigned IP address, the UE may then use the IP address to engage in communication with server(s) 456 via the packet-switched network(s) 424. In particular, the UE may transmit packet-data from that IP address to a destination IP address, and that packet-data may flow via the roaming carrier base station 426 and the roaming carrier SGW 452 to the home carrier PGW 446 and via the packet-switched network(s) 424 to one or more of the server(s) 456. Further, when another party transmits data to the UE's assigned IP address, that data may flow over the packet-switched network(s) 424 to the home carrier PGW 446, and the home carrier PGW 446 may forward that data to the roaming carrier SGW 452 for transmission via the roaming carrier base station 426 to the UE. The communication path 427 illustrates such a path between the UE 412 and server(s) 456.

In all three examples of roaming above, the UE will know when it is and isn't roaming since it must transmit an attachment request to a base station in either its home network or in a roamed-to network. Typically, the UE will recognize candidate base stations according to the respective signal strengths of their respectively broadcast reference signals, which carry identifying information of the respective base station as well as the network to which it belongs (e.g., PLMN identification). In accordance with example embodiments, a UE can track and monitor roaming and non-roaming (home network) operation to build a predictive model for predicting ahead of time when the UE may be expected to roam, where, and for how long, among other descriptive aspects of roaming state.

As an illustration, a particular UE, belonging to or associated with a particular subscriber of a service provider, may engage in communications that at least partially follow a pattern with respect to roaming activities that reflect elements of the subscriber's daily and/or weekly routine. For example, the subscriber might routinely use the UE for data communications while on a daily train commute that traverses a geographic region through which only roaming service is available. Monitoring and tracking could thus collect historical data of this particular routine roaming activity and apply it to a model that can be used to predict ahead of time if and when this particular roaming will occur by recognizing patterns in the historical data. The historical roaming data could include time of day, day of the week, geolocation, and handover patterns, among other information. Similar monitoring and tracking on a continuous (or nearly continuous) basis could thereby be used to construct a predictive model of other roaming that can be used to predict when, where, and for how long a UE will be roaming at any given time on any given day. The accuracy of the model may depend on the degree to which the monitored roaming activity follows one or more routines or patterns, as well as how much roaming data is collected. By consulting the model, a facility or function of the UE could therefore be able to anticipate when roaming is about to occur and use that information to control background communications. In an example, the model could be a statistical model, whereby predicted roaming behavior could be based on various probability calculations that are calibrated using the monitored roaming data. In another example, the model could be based on machine learning, such that monitored roaming activity provides a basis for machine recognition and prediction.

Also in accordance with example embodiments, a UE can track and monitor the communications behavior of one or more application programs running on the UE to build a predictive model for predicting ahead of time what communications activities the one or more application programs will engage in, when, for how long and for what types of data, and whether the communications will be foreground or background. For example, the UE could implement a facility that interfaces with the one or more applications to track and monitor when and for what purpose those applications initiate and/or receive communications via the wireless network. Focusing for the moment on background communications, tracking and monitoring could collect data indicating scheduled downloads of updates or system data, conditions that may trigger data transfers, days and times of communications, and amounts of data uploaded or downloaded. In addition to monitoring applications directly (e.g., via an application interface), the monitoring and tracking facility could also access various portions or segments of data cache of the UE for information indicative of communications behavior of the UE. Then, in a manner similar to the roaming predictive model, a statistical model of communications behaviors of the one or more applications programs could be constructed. The predicted communications activities of the one or more applications could then be based various probability calculations that are calibrated using the monitored communications behavior data. As with roaming prediction, the communication behavior prediction model could be based on machine learning, such that monitored communication behavior provides a basis for machine recognition and prediction. In further accordance with example embodiments, predicted roaming activity and predicted communication behaviors (or activities) of the one or more applications can be analyzed jointly to control how and when the one or more applications engage in wireless communications via the wireless network. More particularly, by anticipating when roaming will occur and for how long, and anticipating what communications—especially what background communications—will be initiated by the one or more application programs, the communications activities of the one or more programs may be modified so as to accommodate background communications efficiently while minimizing (or at least reducing) background communications while the UE is roaming.

In an example embodiment, the UE facility or function that provides for monitoring and tracking of roaming activities, communications behaviors (and/or activities), and predictive model construction, maintenance, and operation is implemented in the form of a "Device Predictive Algorithm Monitor" or "DPAM." The DPAM can also have selective access to communications scheduling and activation of one or more applications by way of respective application program interfaces (APIs). The selective access can be used both to invoke communications behavior, such as triggering initiation of a communication session, and to provide predicted roaming activity to one or more applications in reply to queries from the one or more applications. The one or more applications can then adapt their own communication schedules and/or activities based on the predicted roaming activity.

By controlling communications activities and schedules through the DPAM or other similarly implemented UE facility or function, background communications can be eliminated or reduced during times when the UE is roaming, but in such a way that effected background communications can still be accommodated intelligently and efficiently with respect to available opportunities when the UE is not roaming. DPAM operation in accordance with example embodiments can be described by way of example by considering three example use cases. In the first example use case, the DPAM may predict (i) that a particular application is scheduled to initiate a background communication at a certain time in the near future relative to a current time, for example, in 10 minutes, and (ii) that the background communication usually takes 3 minutes to complete. The DPAM may also predict (iii) that the UE will begin roaming in 5 minutes. Using this information, the DPAM may then, via the API to the particular application, trigger the application to immediately initiate the background communication. By do this, the DPAM causes the background communication to commence and complete before the predicted roaming begins, instead of during the predicted roaming. For this example use case, the 5-minutes-unil-roaming can serve as a sort of threshold, in the sense that it is greater than the 3 minutes needed to complete the background communication.

In the second example use case, the DPAM may predict (i) that a particular application is scheduled to initiate a background communication at a certain time in the near future relative to a current time, for example, in 3 minutes, and (ii) that the background communication usually takes 7 minutes to complete. The DPAM may also predict (iii) that the UE will begin roaming in 5 minutes and is predicted to last for 12 minutes. Using this information, the DPAM may then, via the API to the particular application, cause the application to reschedule the background communication for 20 minutes (or some delay greater than 5+12=17 minutes) from the current time. By do this, the DPAM causes the background communication to commence after the UE is no longer roaming and thereby prevents a background communication that straddles the beginning of the predicted roaming. For this example use case, the 3-minutes-unil-roaming can serve as another sort of threshold, in the sense that it is less than the 7 minutes needed to complete the background communication.

In the third example use case, a particular application may query the DPAM (via the API) to determine the current and predicted roaming states. The reply from the DPAM could indicate one of at least two different states relevant to scheduling of background communications by the particular application: (i) roaming is predicted to begin in x minutes and last y minutes; or (ii) the UE is currently roaming and will stop (i.e., return to the home network) in z minutes. With this information, the particular application could adapt an existing schedule for background communications following logic similar to that of either of the first two example use cases, for example. That is, the particular application could schedule an immediate or a delayed background communication based on whether the communication can be predicted to either complete before roaming begins or needs to wait until roaming has ended. For this example use case, the x-minutes-unil-roaming can serve as still another sort of threshold.

The above three example use cases are illustrative of how predicted roaming and predicted communication behaviors of applications can be jointly applied to controlling communication activities of applications. They are not intended to be limiting with respect to other possible use cases and operation in accordance with example embodiments in general.

Figure 5:
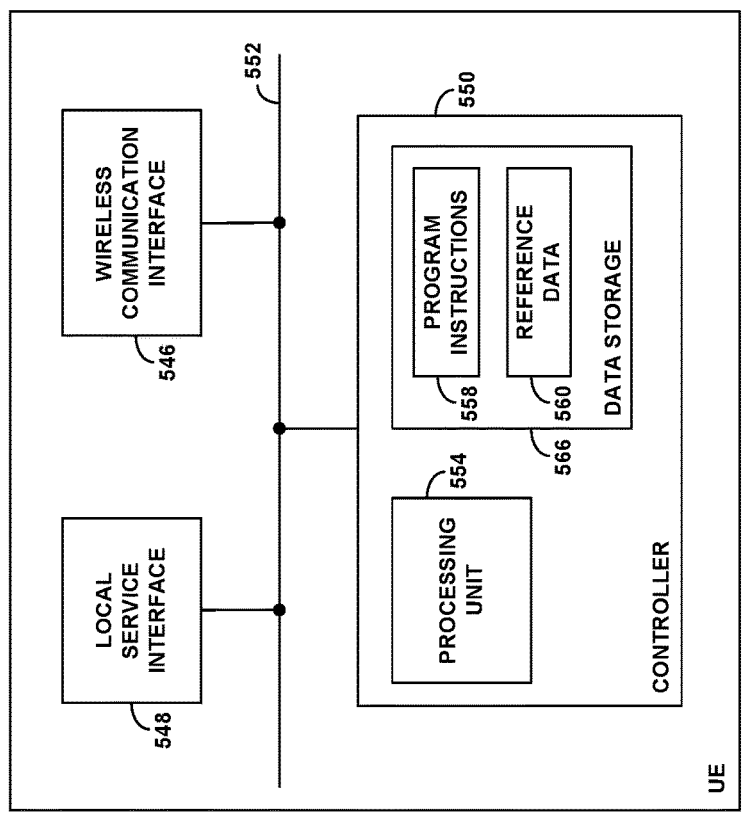
FIG. 5 is a simplified block diagram of an example user equipment device (UE), in accordance with example embodiments.

FIG. 5 is next a simplified block diagram of an example UE, showing some of the components that such a device could include in accordance with an example implementation. As shown in FIG. 5, the example UE includes a wireless communication interface 546, local service interface 548, and a controller 550, all of which could be coupled together or otherwise interconnected by a system bus, network, or other connection mechanism 552. Further, these or other components of the UE could be integrated together in various ways. For instance, the controller could be provided as logic on a chipset that also serves as at least part of the wireless communication interface or local service interface. And the wireless communication interface and local service interface could be combined together. Further, the UE could include other components and take other forms. For instance, if the UE is user operated, the UE could include a user interface. Other examples are possible as well.

In the example UE, the wireless communication interface 546 could be configured to engage in wireless communication with the base station that serves the UE, via a wireless channel between the UE and the base station. As such, the wireless communication interface could include a radio compliant with the protocol that the UE will use for communication with the base station, such as LTE for instance, and could further include an antenna structure for transmitting and receiving via the wireless channel.

The local service interface 548 could then be configured to engage in communication directly or indirectly with one or more other devices. For instance, the local service interface could include a wireless communication interface that operates to communicate with one or more other entities over the same air interface protocol used by wireless communication interface 546 or over a different air interface protocol. (By way of example, the wireless communication interface 546 could communicate with the serving base station according to LTE, and the local service interface 548 could communicate with other devices using LTE or using WiFi.) Alternatively, the local service interface could be configured for connection with a wired link such as an Ethernet connection or other cable connection with one or more other entities.

The controller 550 could be configured to control operation of the UE including implementing various UE operations described herein.

As shown by way of example, the controller could include a processing unit 554 and data storage 556. Processing unit 554 could comprise one or more general purpose processors (e.g., microprocessors) and/or one or more special-purpose processors (e.g., application specific integrated circuits or digital signal processors). And data storage 556 could comprise one or more non-transitory volatile and/or non-volatile storage components, such as magnetic, optical, or flash memory, and could hold or be encoded with program instructions 558 and reference data 560. Program instructions 558 could be executable by processing unit 554 to carry out various UE operations described herein. And reference data 560 could include various data to facilitate carrying out the operations, such as implementation of predictive models of a DPAM.

Figure 6:
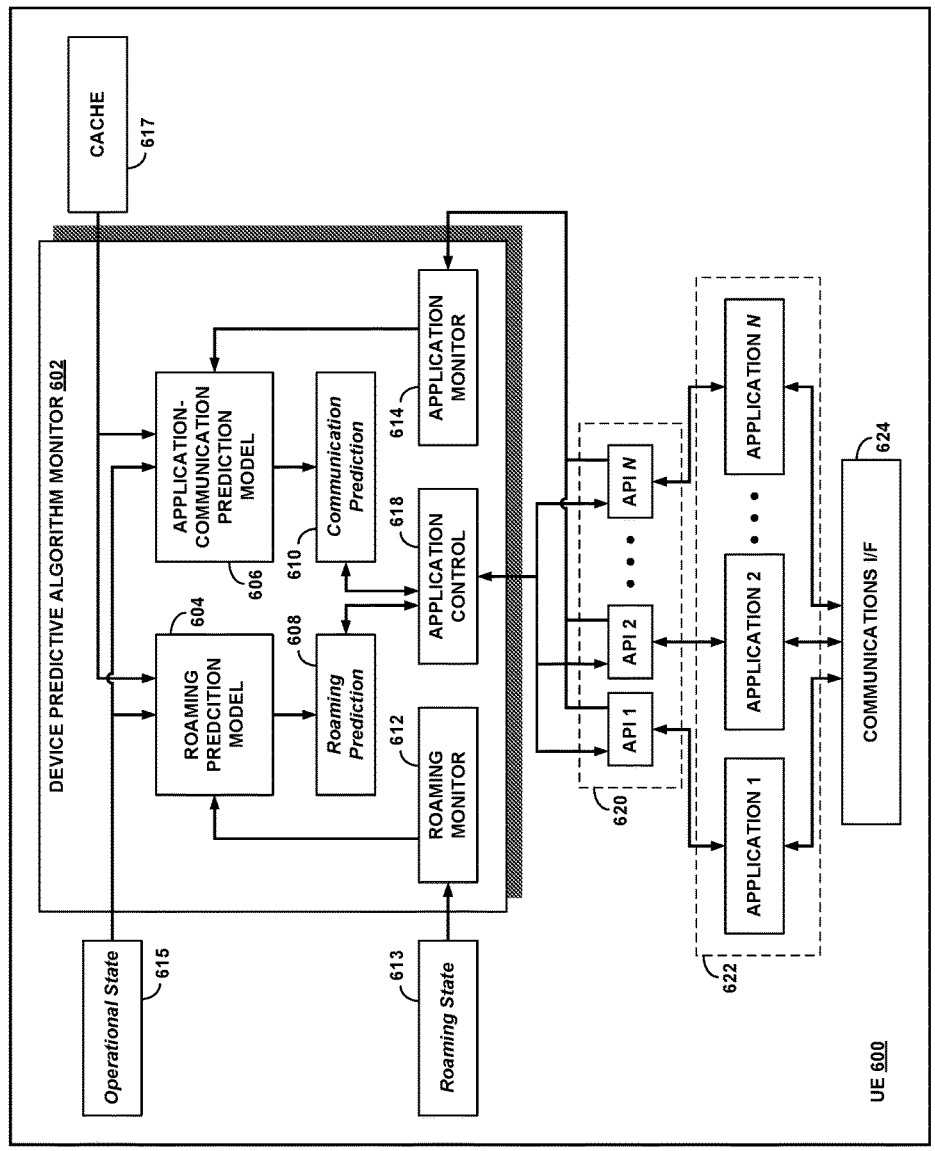
FIG. 6 is a simplified block diagram of a functional architecture of certain aspects of UE operation, in accordance with example embodiments.

FIG. 6 is a simplified block diagram of a functional architecture of certain aspects of UE operation, in accordance with example embodiments. In particular, the functional architecture in FIG. 6 illustrates example functional and structural elements that can support monitoring and prediction operations and control of application communications behaviors described above. The illustrated architecture could be implemented on a UE as software, firmware, hardware, or some combination of these. It will be appreciated that the particular form of the architecture depicted in FIG. 6 is illustrative, and that other specific arrangements are possible as well. Additionally, the illustrated architecture is not necessarily meant to represent UE operations other than those relating to monitoring, predictions, and communication control operations, although there may be elements of the illustrated architecture that are shared with or are in common with other aspects of UE operations besides those immediately described.

As shown, FIG. 6 depicts a UE 600 that includes a DPAM 602, application programs 622, labeled "Application 1," "Application 2," . . . "Application N," APIs 620, labeled "API 1," "API 2," . . . "API N," and communications interface 624. The UE 600 also includes a data cache 617, an operational state register 615, and a roaming state register 613. The cache 617, operational state 615, and roaming state 617 could be part of a common or separate memory or storage, for example. In the context of the present discussion, they may be considered logical structures for maintaining particular types of data and/or information; the specific implementation may be considered arbitrary for current illustrative purposes.

In the example illustrated in FIG. 6, the DPAM 602 includes a roaming prediction model 604, an application-communication prediction model 606, a roaming monitor 612, an application monitor 614, and an application control function 618. The roaming prediction model 604 is arranged to provide a roaming prediction 608 as output, and the application-communication prediction model 606 is arranged to provide a communication prediction 610 as output. Both outputs could be provided as data to specific registers or memory locations, for example, or could be transferred directly to a requesting entity.

Various arrows in FIG. 6 indicate some of the paths and directions that information traverses in operation. Specifically, the operational state 615, which could contain general state information of the UE 600, such as location, current serving base station, and network connectivity, serves as input to both the roaming prediction model 604 and the application-communication prediction model 606. Similarly, the cache 617, which could information such as historical locations and general historical usage activity, also serves as input to both the roaming prediction model 604 and the application-communication prediction model 606. The roaming prediction model also receives input from the roaming monitor 612, which monitors the roaming state 613, as indicated by the arrow from the roaming state 613 to the roaming monitor.

In a similar way, the application-communication prediction model 606 also receives input from the application monitor 614. As shown, the application monitor 614 monitors the applications 622 via the respective APIs 620, as indicated by the arrows from API 1, API 2, . . . API N to the application monitor. A two-way arrow connects each API to its respective application, indicative of information and control flow characteristic of an API.

The application control function 618 is shown as having a respective two-way connection with the roaming prediction 608 and the communication prediction 610. The two-way connection represents both a "push" operation, in which the prediction information is input to the application control function 618, and a "pull" operation, in which the prediction information is supplied to the application control function 618 in reply to a request for the information from one or more of the application programs 622.

The application control function 618 is also shown as having a respective two-way connection with each of the application programs 622 via the respective APIs 620. This two-way connection allows control of communication functions of each application 622 by the DPAM, as described above. It also allows any given application program to query the DPAM for roaming state information, which the given application program can then use to adjust its communication activities and schedule, also as described above.

Each application program 622 is shown as having a two-way connection to the communication I/F 624. This supports communications between each application program and the wireless network. For example, the communication I/F could be part of, or connected with, the wireless communication interface 546 depicted in FIG. 5.

Taking the example operation described above in terms of the three example use cases, the roaming prediction model 604 could use data from the roaming monitor 612, as well as from the operational state 615 and the cache 617, to calibrate model parameters or train a recognition algorithm for prediction of roaming state. Similarly, the application-communication prediction model 606 could use data from the application monitor 614, as well as from the operational state 615 and the cache 617, to calibrate model parameters or train a recognition algorithm for prediction of application-communication behavior. In a push operation, the roaming prediction 608 and communication prediction 610 could be jointly analyzed by the application control function, which could then apply appropriate control to communication behavior and/or activities of one or more of the application programs 622, as described above in the first two example use cases, for example. In a pull operation, one or more of the application programs 622 could query the application control function 618 for roaming prediction information, which, once supplied in reply, could be used by the one or more application programs 622 to adjust its communication schedule, as described above in the third example use case.

It will be appreciated that the example functional architecture illustrated in FIG. 6, and its application to monitoring, prediction, and communication control are example implementations. Other implementations are possible as well.

Figure 7:
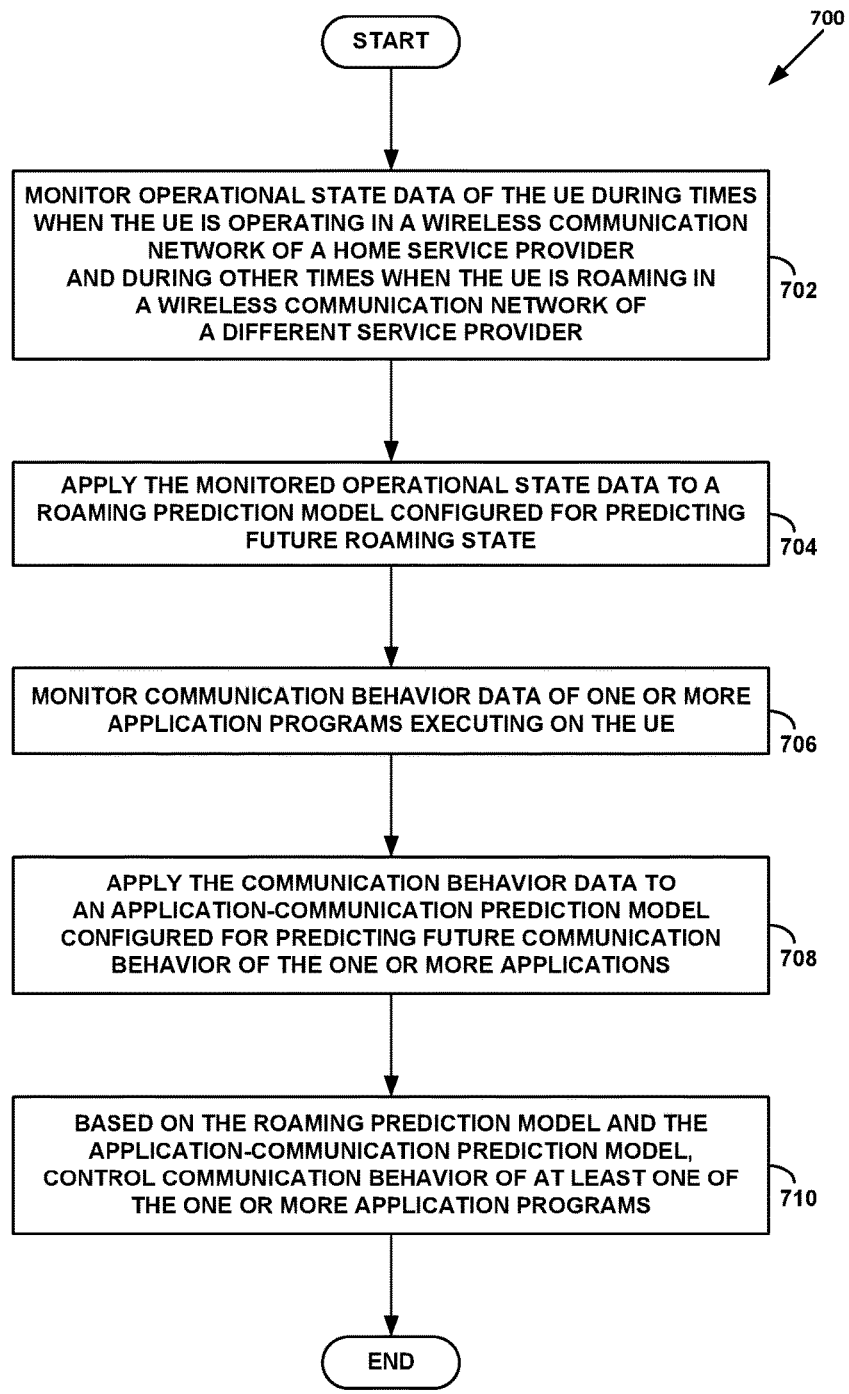
FIG. 7 is a flowchart illustrating an example method, in accordance with example embodiments.

Turning now to an example method, FIG. 7 is flowchart illustrating method 700, according to example embodiments. Example methods, such as method 500, may be carried out in whole or in part by a wireless communication device, such as UE 116 shown in FIG. 1, UEs 212, 312, or 412 shown in FIG. 2, 3, or 4, the UE of FIG. 5, or the UE 600 of FIG. 6. By way of example, the method 500 can be implemented as machine language instructions that can be stored on non-transient machine-readable media (e.g, solid state memory, magnetic disk, etc), and that when executed by one or more processors of a UE to cause the UE to carry out operations, steps, and/or functions of the method.

In example embodiments, method 500 may operable in a UE of configured for operating in a wireless communication network.

As shown by block 502 in FIG. 5, method 500 involves the UE monitoring its operational state data during times when the UE is operating in a wireless communication network of a home service provider, and also during other times when the UE is roaming in a wireless communication network of a different service provider, the operational state data including: location, time of day, roaming status, and communication activity status.

As shown by block 504 in FIG. 5, method 500 next involves the UE applying the monitored operational state data to a roaming prediction model configured for predicting future roaming state. In accordance with example embodiments, the roaming states include roaming, not roaming, transition to roaming, and transition to not roaming.

As shown by block 506 in FIG. 5, method 500 next involves the UE monitoring communication behavior data of one or more application programs executing on the UE. In accordance with example embodiments, the communication behavior data can include: type of wireless communications engaged in by the one or more application programs, type of data transferred during wireless communications engaged in by the one or more application programs, amount of data transferred during wireless communications engaged in by the one or more application programs, duration of wireless communications engaged in by the one or more application programs, time of day, and location.

As shown by block 508 in FIG. 5, method 500 next involves the UE applying the communication behavior data to an application-communication prediction model configured for predicting future communication behavior of the one or more applications. In accordance with example embodiments, communication behavior of the one or more applications can include: scheduling communications with a network-based server, engaging in communications with a network-based server, and initiating communications with a network-based server.

Finally, as shown by block 510, method 500 involves the UE controlling communication behavior of at least one of the one or more application programs, based on the roaming prediction model and the application-communication prediction model.

In accordance with example embodiments, monitoring the operational state data of the UE can entail logging historical operational state data during the times when the UE is not roaming and during the other times when the UE is roaming. Then, applying the monitored operational state data to the roaming prediction model can entail calibrating the roaming prediction model for making future predictions of roaming state.

In accordance with example embodiments, monitoring communication behavior data of the one or more application programs executing on the UE can entail logging historical communication behavior data of the one or more application programs. Applying the communication behavior data to the application-communication prediction model can then entail calibrating the application-communication prediction model for making future predictions of communication behavior of the one or more applications.

In further accordance with example embodiments, the type of wireless communications engaged in by the one or more application programs can be one or more of a foreground communication, a background communication, a download, or upload. And the type of data transferred during the wireless communications engaged in by the one or more application programs can be one or more of media streaming data, application update data, application backup data, or application reporting data.

In accordance with example embodiments, controlling communication behavior of at least one of the one or more application programs based on the roaming prediction model and the application-communication prediction model can entail making a determination that a particular application program has an upcoming background download scheduled during a time when the UE is predicted to be roaming, and in response to the determination, causing the particular application program to delay the scheduled background download.

Also in accordance with example embodiments, controlling communication behavior of at least one of the one or more application programs based on the roaming prediction model and the application-communication prediction model can entail making a determination that a particular application program has an upcoming background download scheduled within a threshold time of when the UE is predicted to start roaming, and in response to the determination, causing the particular application program to commence the scheduled background download sufficiently before the scheduled time so as to complete prior to the predicted start of roaming.

In accordance with example embodiments, controlling communication behavior of at least one of the one or more application programs based on the roaming prediction model and the application-communication prediction model can entail a particular application program querying the roaming prediction model to determine predicted roaming states of the UE during an upcoming time window, and based on the predicted roaming states of the UE during the upcoming time window, the particular application program adapting a starting time of at least one upcoming communication during the upcoming time window.

In further accordance with example embodiments, adapting the starting time of at least one upcoming communication during the upcoming time window based on the predicted roaming states of the UE during the upcoming time window can entail delaying the starting time of a background download scheduled during the upcoming time window in response to a prediction that the UE will transition to roaming during the upcoming time window.

In another example, adapting the starting time of at least one upcoming communication during the upcoming time window based on the predicted roaming states of the UE during the upcoming time window can entail commencing a background download sufficiently before a scheduled time for the background download so as to complete prior to a predicted transition to roaming during the upcoming time window.

In accordance with example embodiments, the respective wireless communication networks of the home service provider and the different service provider could each be configured for operating according to at least one of LTE or CDMA.

It will be appreciated that the example method 500 can include alternate and/or additional steps, while still remaining within the scope and spirit of example embodiments herein.

While various aspects have been disclosed herein, other aspects will be apparent to those of skill in the art. The various aspects disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting. For example, while the disclosed embodiments focus on LTE-based implementations, the disclosed systems and methods are equally applicable to any other protocol or network implementation that is configurable to allocate frequencies to traffic demands as described herein.

We claim:

1. In a user equipment device (UE) configured for operating in wireless communication networks, a method comprising:

monitoring operational state data of the UE during times when the UE is operating in a wireless communication network of a home service provider and during other times when the UE is roaming in a wireless communication network of a different service provider, the operational state data including: location, time of day, roaming status, and communication activity status;

applying the monitored operational state data to a roaming prediction model configured for predicting future roaming state, wherein roaming state comprises: roaming, not roaming, transition to roaming, and transition to not roaming;

monitoring communication behavior data of one or more application programs executing on the UE, the communication behavior data including: type of wireless communications engaged in by the one or more application programs, type of data transferred during wireless communications engaged in by the one or more application programs, amount of data transferred during wireless communications engaged in by the one or more application programs, duration of wireless communications engaged in by the one or more application programs, time of day, and location;

applying the communication behavior data to an application-communication prediction model configured for predicting future communication behavior of the one or more applications, wherein communication behavior of the one or more applications comprises: scheduling communications with a network-based server, engaging in communications with a network-based server, and initiating communications with a network-based server; and based on the roaming prediction model and the application-communication prediction model, controlling communication behavior of at least one of the one or more application programs.

2. The method of claim 1, wherein monitoring the operational state data of the UE during times when the UE is operating in a wireless communication network of a home service provider and during other times when the UE is roaming a wireless communication network of a different service provider comprises logging historical operational state data during the times when the UE is not roaming and during the other times when the UE is roaming, and wherein applying the monitored operational state data to the roaming prediction model comprises calibrating the roaming prediction model for making future predictions of roaming state.

3. The method of claim 1, wherein monitoring communication behavior data of the one or more application programs executing on the UE comprises logging historical communication behavior data of the one or more application programs, and wherein applying the communication behavior data to the application-communication prediction model comprises calibrating the application-communication prediction model for making future predictions of communication behavior of the one or more applications.

4. The method of claim 3, wherein the type of wireless communications engaged in by the one or more application programs is at least one of foreground communication, background communication, download, or upload, and wherein the type of data transferred during the wireless communications engaged in by the one or more application programs is at least one of media streaming data, application update data, application backup data, or application reporting data.

5. The method of claim 1, wherein, based on the roaming prediction model and the application-communication prediction model, controlling communication behavior of at least one of the one or more application programs comprises:

making a determination that a particular application program of the one of the one or more application programs has an upcoming background download scheduled during a time when the UE is predicted to be roaming; and in response to the determination, causing the particular application program to delay the scheduled background download.

6. The method of claim 1, wherein, based on the roaming prediction model and the application-communication prediction model, controlling communication behavior of at least one of the one or more application programs comprises:

making a determination that a particular application program of the one of the one or more application programs has an upcoming background download scheduled within a threshold time of when the UE is predicted to start roaming; and in response to the determination, causing the particular application program to commence the scheduled background download sufficiently before the scheduled time so as to complete prior to the predicted start of roaming.

7. The method of claim 1, wherein, based on the roaming prediction model and the application-communication prediction model, controlling communication behavior of at least one of the one or more application programs comprises:

a particular application program of the one or more application programs querying the roaming prediction model to determine predicted roaming states of the UE during an upcoming time window; and based on the predicted roaming states of the UE during the upcoming time window, the particular application program adapting a starting time of at least one upcoming communication during the upcoming time window.

8. The method of claim 7, wherein, based on the predicted roaming states of the UE during the upcoming time window, adapting the starting time of at least one upcoming communication during the upcoming time window comprises delaying the starting time of a background download scheduled during the upcoming time window in response to a prediction that the UE will transition to roaming during the upcoming time window.

9. The method of claim 7, wherein, based on the predicted roaming states of the UE during the upcoming time window, adapting the starting time of at least one upcoming communication during the upcoming time window comprises commencing a background download sufficiently before a scheduled time for the background download so as to complete prior to a predicted transition to roaming during the upcoming time window.

10. The method of claim 1, wherein the respective wireless communication networks of the home service provider and the different service provider are each configured for operating according to at least one of LTE or CDMA.

11. A user equipment device (UE) configured for operating in wireless communication networks, the UE comprising:

one or more processors; and memory storing instructions that, when executed by the one or more processors, cause the UE to carry out operations including: monitoring operational state data of the UE during times when the UE is operating in a wireless communication network of a home service provider and during other times when the UE is roaming in a wireless communication network of a different service provider, the operational state data including: location, time of day, roaming status, and communication activity status;

applying the monitored operational state data to a roaming prediction model configured for predicting future roaming state, wherein roaming state comprises: roaming, not roaming, transition to roaming, and transition to not roaming;

monitoring communication behavior data of one or more application programs executing on the UE, the communication behavior data including: type of wireless communications engaged in by the one or more application programs, type of data transferred during wireless communications engaged in by the one or more application programs, amount of data transferred during wireless communications engaged in by the one or more application programs, duration of wireless communications engaged in by the one or more application programs, time of day, and location;

applying the communication behavior data to an application-communication prediction model configured for predicting future communication behavior of the one or more applications, wherein communication behavior of the one or more applications comprises: scheduling communications with a network-based server, engaging in communications with a network-based server, and initiating communications with a network-based server; and based on the roaming prediction model and the application-communication prediction model, controlling communication behavior of at least one of the one or more application programs.

12. The UE of claim 11, wherein monitoring the operational state data of the UE during times when the UE is operating in a wireless communication network of a home service provider and during other times when the UE is roaming a wireless communication network of a different service provider comprises logging historical operational state data during times when the UE is not roaming and during the other times when the UE is roaming, wherein applying the monitored operational state data to the roaming prediction model comprises calibrating the roaming prediction model for making future predictions of roaming state, wherein monitoring communication behavior data of the one or more application programs executing on the UE comprises logging historical communication behavior data of the one or more application programs, wherein applying the communication behavior data to the application-communication prediction model comprises calibrating the application-communication prediction model for making future predictions of communication behavior of the one or more applications, and wherein the type of data transferred during the wireless communications engaged in by the one or more application programs is at least one of media streaming data, application update data, application backup data, or application reporting data.

13. UE of claim 11, wherein, based on the roaming prediction model and the application-communication prediction model, controlling communication behavior of at least one of the one or more application programs comprises:

making a determination that a particular application program of the one of the one or more application programs has an upcoming background download scheduled for a given time that is one of: during a time when the UE is predicted to be roaming or within a threshold time of when the UE is predicted to start roaming; and in response to the determination, causing the particular application program to do one of delay the scheduled background download so as not to occur during the predicted roaming or commence the scheduled background download sufficiently before the scheduled time so as to complete prior to the predicted start of roaming.

14. UE of claim 11, wherein, based on the roaming prediction model and the application-communication prediction model, controlling communication behavior of at least one of the one or more application programs comprises:

a particular application program of the one or more application programs querying the roaming prediction model to determine predicted roaming states of the UE during an upcoming time window; and based on the predicted roaming states of the UE during the upcoming time window, the particular application program adapting a starting time of at least one upcoming communication during the upcoming time window.

15. UE of claim 11, wherein the UE is configured for operating according to at least one of LTE or CDMA.

16. A non-transitory computer-readable medium have instructions stored thereon that, when executed by one or more processors of a user equipment device (UE) configured for operating in wireless communication networks, cause the UE to carry out operations including:

monitoring operational state data of the UE during times when the UE is operating in a wireless communication network of a home service provider and during other times when the UE is roaming in a wireless communication network of a different service provider, the operational state data including: location, time of day, roaming status, and communication activity status;

applying the monitored operational state data to a roaming prediction model configured for predicting future roaming state, wherein roaming state comprises: roaming, not roaming, transition to roaming, and transition to not roaming;

monitoring communication behavior data of one or more application programs executing on the UE, the communication behavior data including: type of wireless communications engaged in by the one or more application programs, type of data transferred during wireless communications engaged in by the one or more application programs, amount of data transferred during wireless communications engaged in by the one or more application programs, duration of wireless communications engaged in by the one or more application programs, time of day, and location;

applying the communication behavior data to an application-communication prediction model configured for predicting future communication behavior of the one or more applications, wherein communication behavior of the one or more applications comprises: scheduling communications with a network-based server, engaging in communications with a network-based server, and initiating communications with a network-based server; and based on the roaming prediction model and the application-communication prediction model, controlling communication behavior of at least one of the one or more application programs.

17. The non-transitory computer-readable medium of claim 16, wherein monitoring the operational state data of the UE during times when the UE is operating in a wireless communication network of a home service provider and during other times when the UE is roaming a wireless communication network of a different service provider comprises logging historical operational state data during times when the UE is not roaming and during the other times when the UE is roaming, wherein applying the monitored operational state data to the roaming prediction model comprises calibrating the roaming prediction model for making future predictions of roaming state, wherein monitoring communication behavior data of the one or more application programs executing on the UE comprises logging historical communication behavior data of the one or more application programs, wherein applying the communication behavior data to the application-communication prediction model comprises calibrating the application-communication prediction model for making future predictions of communication behavior of the one or more applications, and wherein the type of data transferred during the wireless communications engaged in by the one or more application programs is at least one of media streaming data, application update data, application backup data, or application reporting data.

18. The non-transitory computer-readable medium of claim 16, wherein, based on the roaming prediction model and the application-communication prediction model, controlling communication behavior of at least one of the one or more application programs comprises:

making a determination that a particular application program of the one of the one or more application programs has an upcoming background download scheduled for a given time that is one of: during a time when the UE is predicted to be roaming or within a threshold time of when the UE is predicted to start roaming; and in response to the determination, causing the particular application program to do one of delay the scheduled background download so as not to occur during the predicted roaming or commence the scheduled background download sufficiently before the scheduled time so as to complete prior to the predicted start of roaming.

19. The non-transitory computer-readable medium of claim 16, wherein, based on the roaming prediction model and the application-communication prediction model, controlling communication behavior of at least one of the one or more application programs comprises:

a particular application program of the one or more application programs querying the roaming prediction model to determine predicted roaming states of the UE during an upcoming time window; and based on the predicted roaming states of the UE during the upcoming time window, the particular application program adapting a starting time of at least one upcoming communication during the upcoming time window.

20. The non-transitory computer-readable medium of claim 16, wherein the UE is configured for operating according to at least one of LTE or CDMA.

\* \* \* \* \*